April 10, 1945. W. WORTH 2,373,157
OIL TEMPERATURE REGULATOR
Filed April 18, 1941 7 Sheets-Sheet 1

FIG. 1.

INVENTOR
WELDON WORTH

FIG. 6.

April 10, 1945.  W. WORTH  2,373,157

OIL TEMPERATURE REGULATOR

Filed April 18, 1941   7 Sheets-Sheet 7

INVENTOR
WELDON WORTH
BY
ATTORNEYS

Patented Apr. 10, 1945

2,373,157

UNITED STATES PATENT OFFICE 2,373,157

OIL TEMPERATURE REGULATOR

Weldon Worth, Dayton, Ohio

Application April 18, 1941, Serial No. 389,203

5 Claims. (Cl. 257—128)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to liquid temperature regulators, and is designed more particularly for regulating the temperature of a circulating lubricant used in internal combustion engines.

While for illustrative purpose, but with no intent to unduly limit the scope or application of the invention, it is herein shown and described in its application to lubrication systems for engines, for which it is especially adapted, it is to be understood that it is not limited thereto, but is of general application.

There are already in use several particular types of liquid coolers and oil temperature regulators, which include a cooling passage and a by-pass passage in thermal contact therewith, and at the present time the principal use for oil coolers of this general type is in airplane engine installations. It is a problem in coolers of this type to provide oil coolers having a maximum cooling efficiency, a minimum weight, minimum frontal area, a minimum resistance in the by-pass passage, a maximum efficiency of the by-pass passage in warming a path through a congealed cooling passage, an arrangement having maximum simplicity and ruggedness and a mounting arrangement that is simple and compact and provides protection to the cooler in both installed and detached conditions.

It is an object of this invention to provide an oil cooler of the type using core tubes through which the air flows, and which is so arranged as to provide maximum cooling efficiency by providing oil flow passages of the cross-flow type, wherein the oil flows perpendicular to and between the core tubes.

It is a further object of this invention to provide an oil cooler in which the oil flow passages are arranged to provide even distribution of the cooling oil flow, with no dead pockets.

It is a further object of this invention to provide a cross flow oil cooler wherein the efficiency of a heat exchanger embodying the counter-flow principle is incorporated, in which the hottest oil is thermally exposed to the heated air, and the colder oil is thermally exposed to the cooler air.

It is a further object of this invention to provide an oil cooler in which the cooling path is of minimum length and flow resistance that is consistent with good cooling, and which has a cooling path that may be warmed with hot oil flow through the by-pass over a minimum area.

It is a further object of this invention to provide an oil cooler construction which incorporates no flat surfaces that are subject to deflection by oil pressures.

It is a further object of this invention to provide a cooler with less weight by eliminating the number of baffle plates lying parallel to the core tubes that are commonly used.

It is a further object of this invention to provide an oil cooler arrangement having a by-pass passage and a cooling passage wherein the pressure drop of the by-pass passage is not available to cause oil flow through the cooling passage when access to both passages is open.

It is a further object of the invention to reduce the frontal area of the by-pass passage to a minimum, consistent with maximum efficiency and to utilize part of the normal frontal area of the jacket for necessary communicating portions of the cooling passage.

It is a further object of this invention to provide an oil cooler arrangement which is versatile in size, flow capacity, and length of core tubes, by permitting supports of the core tubes at their mid portions, and which avoids the necessity for a large number of flat baffle plates which extend the length of the cooler parallel to the core tubes and across the width of the cooler.

It is a further object of this invention to provide a mounting arrangement of simple and compact design, which protects the cooler against vibrations when installed, which isolates the cooler from the duct but provides a resilient seal therewith, and which mounting structure is readily removable and remains in part attached to the cooler so that it provides protection to the cooler from inadvertent damage in handling and storage.

Other objects, advantages, and improved results will be apparent from the following:

In the drawings wherein like reference characters denote like or corresponding parts.

Figure 1:
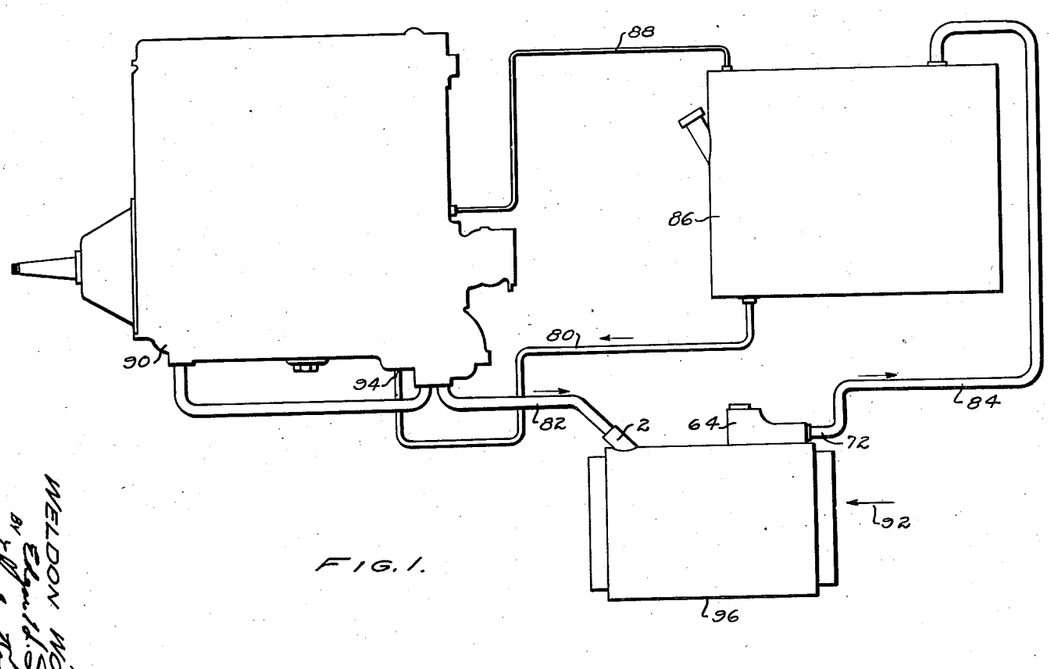
Fig. 1 is a diagrammatic sketch showing the oil cooler in a typical engine installation arrangement showing the oil tank, the oil inlet and outlet lines, the engine, the oil cooler, and oil cooler valve in an operable arrangement.

Referring to Fig. 1, 86 represents an oil tank in which the oil supply is stored when not being circulated through the engine. 80 represents the line for supplying oil from the tank to the inlet 94 of the engine oil pump, which is located on the engine 90. After circulating through the engine, the oil is pumped out of the engine through line 82 into inlet 2 of the oil cooler 96. After circulating through the oil cooler, the oil passes from the valve outlet 72 through the line 84 and is discharged into the tank. Line 88 is a vent connecting the air space of the tank to the engine. Arrow 92 indicates the direction of the cooling air flow that passes through the cooler.

Figure 2:
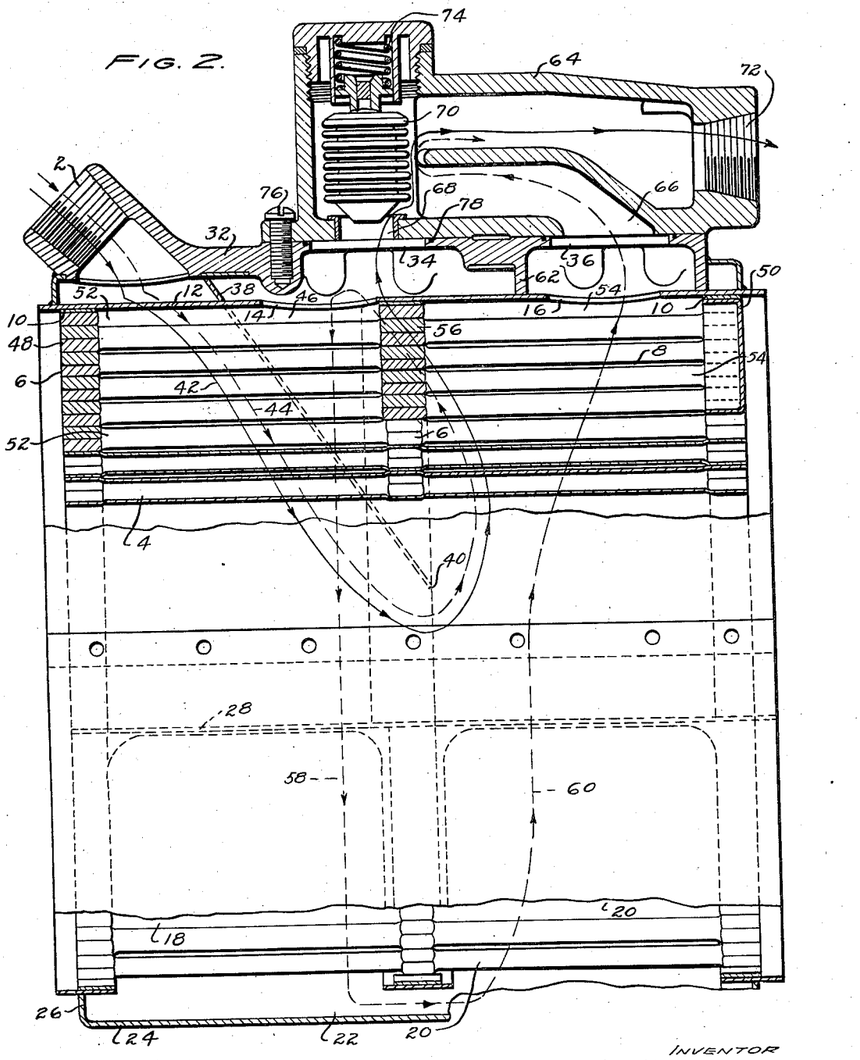
Fig. 2 is a sectioned side elevation of an oil cooler and valve having two passes across the core for the cooling passage.
Figure 7:
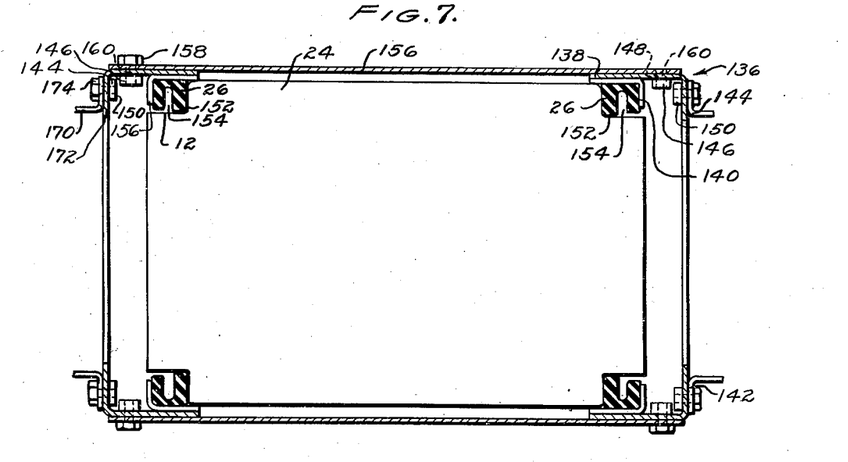
Fig. 7 shows a side view of the cooler with the mounting rings in place.

Referring to Fig. 2, the cylindrical cooler is shown in a partially sectioned view. The oil cooler comprises the core tubes 4, which are nested in and soldered to the cylindrical shell 12, the outer jacket 24, and the oil inlet 2, with outlets 34 and 36. The air flows parallel to and through the inside of the core tubes and the oil flows across and between the core tubes. The core tubes 4 are circular in cross section and are formed with hexagonal expansions 6 at the end portions and at the center, which permit them to nest together in honeycomb fashion with small spacing 8 between the core tubes, through which the oil flows as it is being cooled. The core tubes are assembled in a cylindrical shape and soldered together at each end to avoid leakage from the oil passages. Seep leakage along the tubes through the partition formed by the center expansion of the tubes is not objectionable, but the joints should be sufficiently tight to prevent substantial leakage. A center baffle plate or filler pieces as shown in Fig. 7 can also be used to provide the seal. Around each section of the core where the tubes are expanded, there is located a ring 10, to which the expanded portions of the core are soldered, and which gives an even circular contour to the core before it is assembled in the shell 12. The shell 12 is in the form of a cylinder having openings 14 and 16 for the inlet and outlet for oil flow to the cooling passages. It also has openings 18 and 20 for communication from the first and second pass to the connecting passage 22, which is located out-side of the shell 12 and within the jacket 24. The jacket 24 completely surrounds the shell 12, and is spaced away from the shell to provide the desired flow area for the passages which are formed thereby. The ends of this jacket spacing are closed by the turned ends 26. The space formed between the jacket and shell is divided into two portions by leak-tight partitions 28, only one of which is shown in Fig. 2, but both of which are shown in Fig. 4.

Referring again to Fig. 4, the lower portion 22 of the jacket formed chambers, as stated before, forms a communication between the two cooling passes, and the upper portions 30 of the jacket chamber form a passage common to both the by-pass passage and the cooling passage. Referring back to Fig. 2, the jacket has three openings at the top, which are formed by the casting 32 which is registered with openings in the jacket and soldered thereto. These openings are the common inlet 2, the outlet 34 from the by-pass passage, and the outlet 36 from the cooling passage. The inlet 2 communicates with the outlet 34 through the by-pass passage which is formed by the shell 12, the jacket 24, and the leak-tight partition 28. This by-pass passage is traced by the solid line 42. The flow through this by-pass passage is also controlled by the baffle 38, which is a horseshoe-shaped partition forming a wall between the shell and the jacket, and extending from the top of the cooler, as shown in Fig. 2 and Fig. 4, around each side of the cooler to the point 40 where it terminates. For proper operation it is necessary for the oil flowing through the by-pass passage to warm a complete passage through the cooling element, and the baffle 38 accomplishes this purpose. In flowing from the inlet 2 to the outlet 34, the oil may flow around either or both ends 40 of the baffle.

The by-pass passage 42 also provides the initial part of the cooling passage. The cooling passage is traced by the dotted line 44, and is substantially common with the by-pass passage 42 until the oil being by-passed flows through the outlet 34. At substantially this point the oil flowing through the cooling passage flows downward through the opening 14 into the center portion of the shell which forms the actual cooling passage.

Figure 4:
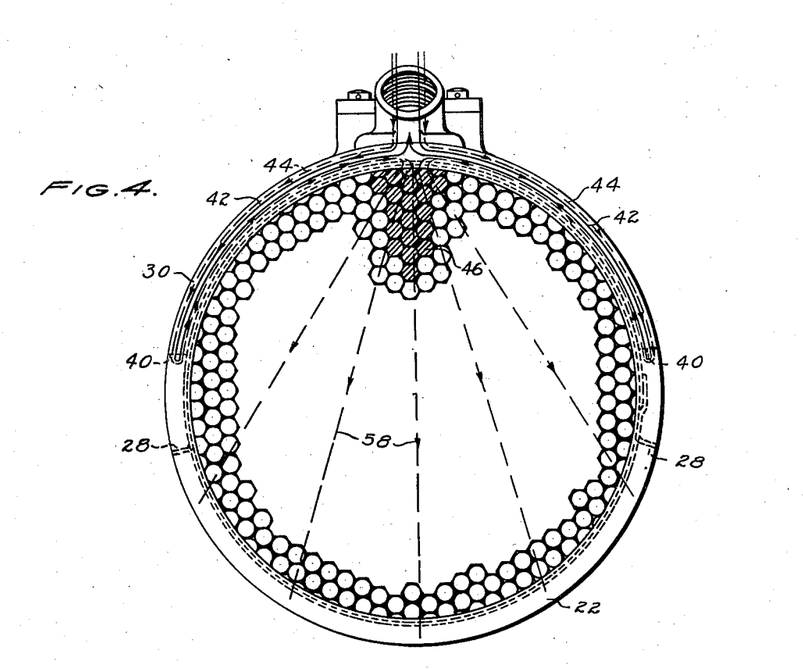
Fig. 4 is an end view showing the core tube arrangement and the outer jacket with reference to the inner shell, which provides the by-pass passage and communicating passage between the two cooling passes.

In immediate communication with the opening 14 is the header chamber, or distribution chamber 46, shown by the shaded area in Fig. 4, representing that portion of the core from which the core tubes have been eliminated. Each end of the core has been sealed up through this area by the use of the hexagonal plugs, as shown at 48, Fig. 2, or by a plate 50, shown at the other end of the core.

The chamber 46 is divided into an inlet chamber 52 and an outlet chamber 54 by the hexagonal plugs 56 which are similar in arrangement to the tube ends 6 or the plugs 48. The inlet chamber 52 provides for even distribution of the oil to all of the openings 8 between the tubes that are in communication therewith. The oil in the cooling passage flows into these openings, spreads outward in a fan-like pattern, as shown in Fig. 4, and flows downward to the opening 18, which is formed by cutting away the shell 12. The opening 18 extends over the entire lower portion of the core from one partition 28 to the other one. This fan-like flow pattern provides substantially even lengths of flow passage for all particles of oil flowing across the core. The downward flow of the cooling passage just described, forms the first pass, and is indicated by that portion of the dotted line 44 which is notated 58. Communication between the opening 18 and the opening 20 is provided by the passage 22 and the flow upward through the core to the outlet 16 forms the second pass 60, and is the reverse of the flow downward to the first pass. Communication between the outlet 16 and the outlet 36 is maintained by the walls 62 of the outlet casting 32, which are circular in plan section and are soldered to the shell 12 so that there can be no leakage, and all oil that passes through the outlet 16 must flow through the outlet 36.

The valve 64 is not part of this invention, but shows the conventional manner in which a valve of this type may be used with this oil cooler. It embodies an inlet 66 which mates with the outlet 36, and an inlet 68 which mates with the by-pass outlet 34. As shown in Fig. 2 the oil from both of these outlets flows in and around the thermostatic element 70 and through the valve outlet 72. The thermostatic element 70 regulates the flow through outlet 68 in accordance with the temperature of the lubricating oil, and incorporates a pressure relief spring 74 to avoid excessive pressure on the oil cooler by reason of the restriction in the cooling passage. The valve is readily detachable from the cooler and is held in place by the screws 76 and leakage is prevented by the gaskets 78.

Figure 3:
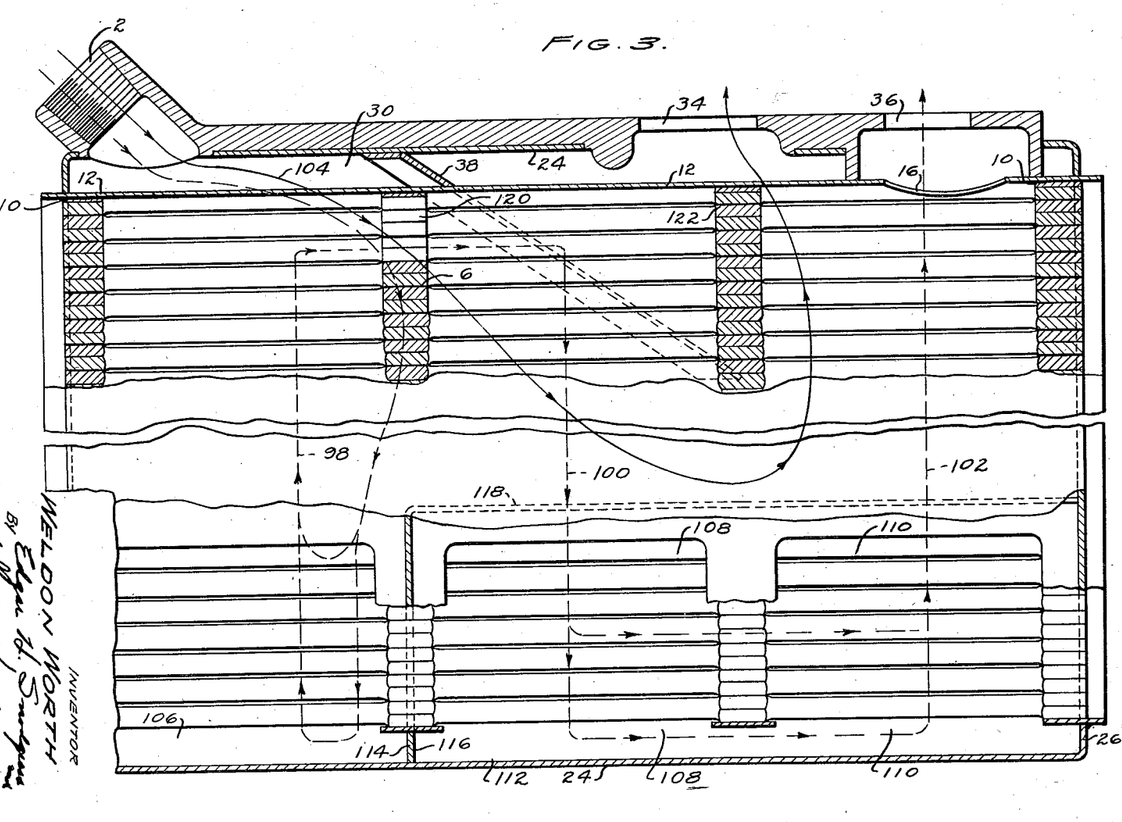
Fig. 3 is a view similar to that of Fig. 2, showing an oil cooler having three passes in the cooling passage of the oil flow through the cooler.

In Fig. 3, there is shown an oil cooler arrangement which is similar to that shown in Fig. 2, except as stated before, it incorporates a three-pass cooling passage. The three-pass circulation may be desirable with standard length core tubes if the oil flow is rather low and it is necessary to maintain the proper cooling velocity between the core tubes. It may also be used with normal oil flows when very long core tubes are used in designing an oil cooler of minimum frontal area. It is necessary to maintain oil velocities above certain values to provide cooling efficiency. This arrangement shows how it is possible to increase the number of passes to any desired number, and thus increase the oil velocity in each pass. In Fig. 3 it will be noted that the hexagonal expansions of the core tube are located at each end and also at two intermediate points. This separates the oil passages between the core tubes into three passes, indicated by the dotted lines 98, 100, and 102, being the first, second, and third passes respectively. The arrangement for collecting and distributing the oil for each path is similar to that used in Fig. 2. The by-pass flow path is indicated by the solid line 104, which passes through the inlet 2 around the outside of the shell 12 in the passage 30 formed between the outer jacket 24 and the inner shell. The flow is directed downward around each side of the jacket passage by the baffle 38, in the same manner as in Fig. 2, thus providing communication between the inlet 2 and the outlet from the by-pass passage 34. The cooling passage differs somewhat in that the first inlet through the shell to the cooling core is at the bottom of the cooler through inlet 106, which is formed by cutting out a substantial portion of the shell at this point. There are similarly located openings in the shells 103 and 110. 108 and 110 form the outlet from the second pass and the inlet to the third pass, and the passage 112 provides the communication between these openings 108 and 110. This passage 112 is formed between the shell and the jacket and is isolated from the opening 106 and the by-pass path 104 by the liquid-tight partition 114. This partition is formed in two parts, the segmented annular shaped portion, indicated by the numeral 116, and the straight walls 118 which are located on both sides and run parallel to the core tubes. Both of these portions extend only from the inner shell to the outer jacket.

Oil entering the first pass through opening 106 flows upward and converges upon the distribution chamber 46, as shown in Fig. 4, with the same fan-shaped flow pattern, except that the direction of flow is reversed. This chamber is provided with open communication from the first pass to the second pass by omitting the tube ends in that portion, indicated by the numeral 120. The tube ends are also inserted in the part marked 122 and this isolates the distribution chamber in the second pass from the third pass. The oil having entered the second pass, indicated by the dotted line 100 in Fig. 3, can flow downward through the oil passages, through the outlet 108, into the passage 112, and from this passage into the opening 110, and up through the core in the third pass 102 to the distribution chamber 46, and through the outlet opening 16 and the outlet 36. By studying this arrangement and the arrangement shown in Fig. 2, it is apparent that this method or arrangement can be extended to include any desired number of passes depending upon the desired oil flow, velocities, and other factors.

Figure 5:
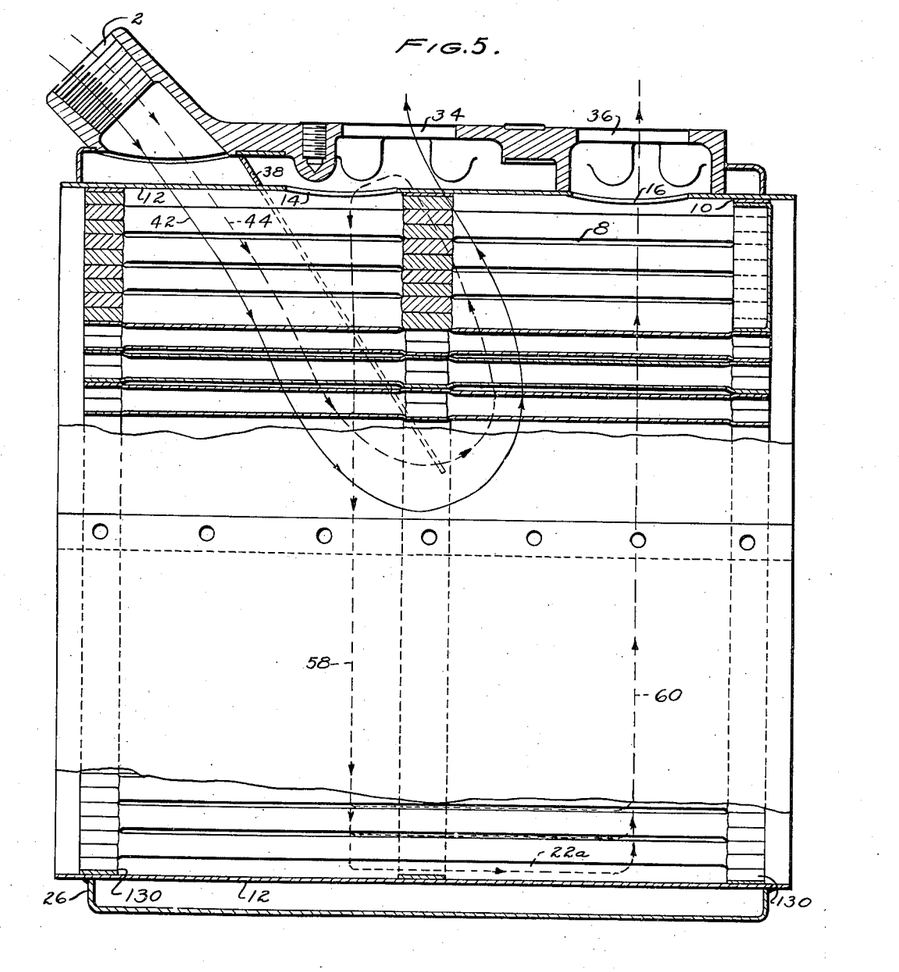
Fig. 5 shows another view of the oil cooler similar to that in Fig. 2, in which the communicating passage between the two cooling passes is not located in the jacket, but is obtained by eliminating the center expansions in the core tube and allowing the oil to flow parallel to the core tubes and between the core tubes from one pass to another.

Fig. 5 shows an oil cooler arrangement similar to Fig. 2 in all respects except that the passage 22 of Fig. 2, which forms a communication between the first and second pass, is located in the core within the oil cooler shell and consequently there are no openings 18 and 20 in the shell when the arrangement in Fig. 5 is used. The lower portion of the oil cooler core, indicated by 22A is devoted to the communicating passage between the first pass, indicated by the dotted line 58, and the second pass, indicated by the dotted line 60. This lower portion of the core is formed with core tubes that do not have the center hexagonal expansion. The oil, therefore, can flow from the first pass to the second pass along the space between the core tubes and upward from that point through the second pass. With this arrangement there is no leak-tight partition 28 and the oil in the by-pass passage and the oil flowing from the inlet 2 to the by-pass outlet 34, or to the opening 14 of the first cooling pass, may flow through the entire jacket chamber, including that portion around the bottom of the core. This arrangement offers little advantage from a performance standpoint, but does provide some advantages of construction that may be desirable in some instances.

Figure 6:
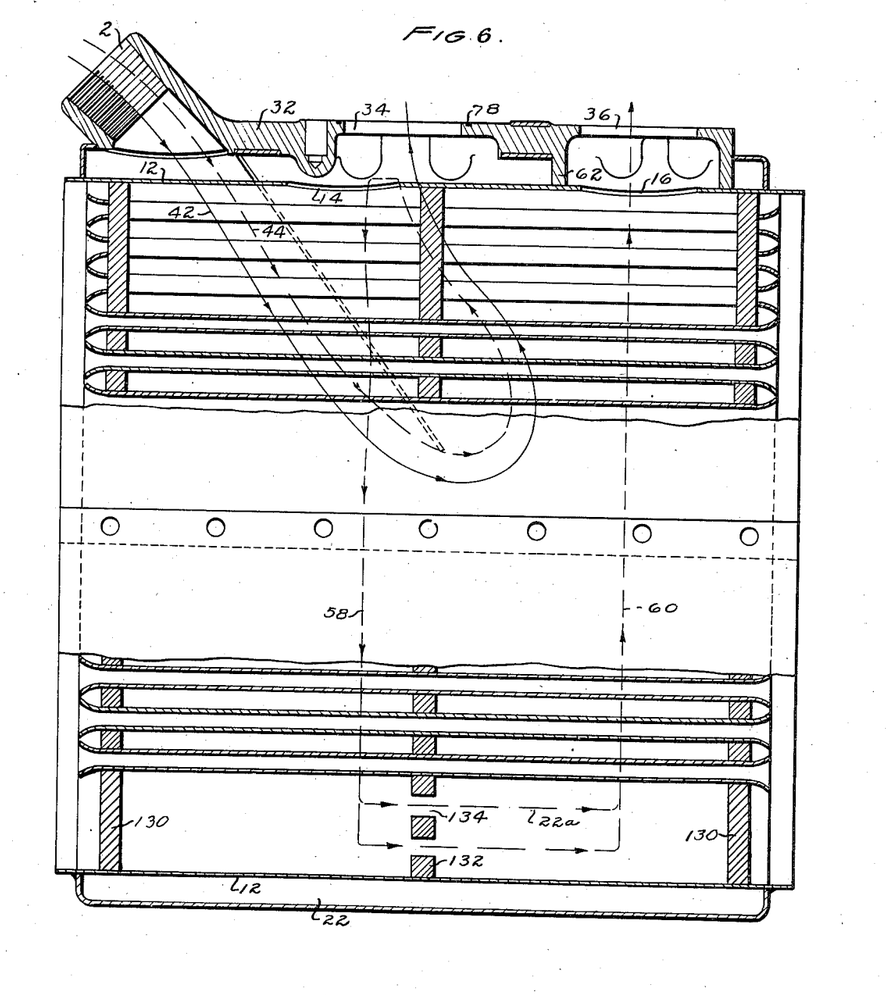
Fig. 6 is another arrangement shown similarly to Fig. 2. The expansion of the core tubes is replaced by header plates in the core face and at the middle portion of the core tubes. In this arrangement the communication from one cooling pass to the other is provided within the inner shell by openings in the center header plate.

Fig. 6 shows another similar arrangement where header plates 130 and 132 with inserted core tubes are used instead of hexagonal expanded end portions of the core tubes. The core tubes are soldered to the end headers and the same leak-tight core is provided as with the expanded hexagonal ends. The division of the core into first and second passes is accomplished by the baffle 132, and in this particular embodiment of the invention, as in Fig. 5, the communicating passage between the first and second pass is located within the shell 12. This communication 22A between the first and second pass, indicated by the dotted lines 58 and 60, is provided by omitting the outer row of core tubes in the lower portion of the oil cooler and leaving openings 134 in the header plate 132.

Figure 8:
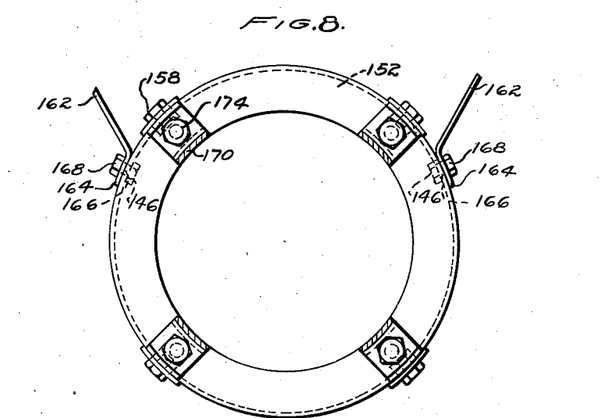
Fig. 8 shows an end view of the cooler with mounting rings and supporting arms.
Figure 9:
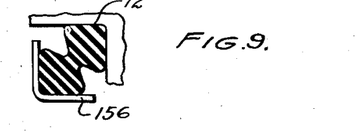
Fig. 9 shows a cross section of an alternate form for the resilient mounting ring.

Referring to Fig. 7, there is shown a mounting arrangement for mounting the coolers just described, which by its construction permits it to be easily detached from the airplane structure, and it thus becomes an integral part of the cooler that protects it from damage during shipment, storage and handling. Because of the weight of coolers and their rather fragile construction, they are frequently damaged in handling. The mounting rings 136 are located at each end of the oil cooler. These rings are circular in shape and formed with an outer rim 138. The outer end of the annular rim 138 has an inward radially extending flange 144. At the inner end of the rim 138 there is located a retainer ring 140 which has a cylindrical section that is welded to the rim 138 and radial extending wall that forms a shoulder to fit against the resilient ring 152. The rim 138 at several locations about its periphery has threaded nuts 146 riveted to the inner surface and aligned with a hole 148. The particular distribution of these nuts is shown in Fig. 8, which has six of such nuts located around the periphery. There are nuts 150 attached to the flange 144 in a similar manner. Four of these are shown in Fig. 8.

At each end of the oil cooler there is a shoulder formed by the shell 12 and the end 26 of the jacket 24. The resilient ring 152 is held between this shoulder and the retainer ring 138. The resilient ring 152 may be made from rubber or any suitable material, and has the cut-out portions 154 which can be varied in size or shape to provide the desired flexibility between the mounting ring and the oil cooler.

The two mounting rings are held in place by the connecting strips 156, which are attached by the studs 158, which are inserted in the holes 160 of the connecting strips and screwed into the nuts 146. The supporting arms 162 on which the oil cooler is mounted, have feet 164 through which are drilled the holes 166. Studs 168 are inserted in these holes and screwed into the nuts 146 to anchor the supporting arms firmly to the mounting ring. The connecting air duct 170 is formed with a flange 172 that rests against the flange 144 of the mounting ring and is held in place by the studs 174, which are inserted through holes in the air duct flange and screwed into the nuts 150.

It is apparent from observing the mounting arrangement shown in Fig. 7 and Fig. 8 that the oil cooler may be very readily detached from the air duct and supporting arms by the removal of a few studs.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. In an oil cooler, a shell, a plurality of cooling elements within and extending lengthwise of said shell and spaced one from the other to form an oil flow path, means for closing the spaces between said cooling elements adjacent the respective ends thereof, other means for closing the spaces between said cooling elements intermediate the ends thereof to divide said oil flow path into at least two oil passes, the sectional area of each oil pass taken on a line transverse to said cooling elements being defined by the surrounding wall of said shell, a structure arranged exteriorly of and spaced from said shell to form a by-pass passage in heat exchange relation to each of said oil passes, connections forming an inlet and an outlet for said by-pass passage, a substantially U-shaped baffle in said by-pass passage to cause oil flowing through said passage to contact portions of said shell which extend about the respective oil passes, said shell having openings communicating respectively with the oil passes adjacent the respective ends of said shell and constituting an inlet and an outlet, one of said openings communicating with said by-pass passage, and a passage arranged substantially opposite to one of said openings to connect the oil pass with which that opening communicates with the adjacent oil pass.

2. In an oil cooler, a shell, a plurality of cooling elements within and extending lengthwise of said shell and spaced one from the other to form an oil flow path, means for closing the spaces between said cooling elements adjacent the respective ends thereof, other means for closing the spaces between said cooling elements intermediate the ends thereof to divide said flow path into three oil passes, the sectional area of each oil pass taken on a line transverse to said cooling elements being defined by the surrounding wall of said shell, a structure arranged exteriorly of and spaced from said shell to form a by-pass passage in heat exchange relation to each of said oil passes, a baffle disposed between said shell and said surrounding wall to provide a path in said by-pass passage that contacts the circumferential wall of each of said oil passes, an inlet for said by-pass passage adjacent the first oil pass, said shell having an opening substantially opposite said inlet to connect said by-pass passage with the first oil pass, a passage connecting said first oil pass with the second oil pass adjacent that side of said shell opposite said opening, and a passage connecting said second oil pass with the third oil pass adjacent that side of said shell having said opening, said shell having a second opening communicating with said third pass substantially opposite the last mentioned passage.

3. In an oil cooler, a shell, a plurality of cooling elements within and extending lengthwise of said shell and spaced one from the other to form an oil flow path, means for closing the spaces between said cooling elements adjacent the respective ends thereof, other means for closing the spaces between said cooling elements intermediate the ends thereof to divide said oil flow path into a plurality of oil passes, the sectional area of each oil pass taken on a line transverse to said cooling elements being defined by the surrounding wall of said shell, an exterior wall extending entirely about and spaced from said shell and having parts at the respective ends thereof to enclose the space between said shell and said wall, and partitions dividing said space into two chambers extending over opposite sides of said shell, one of said chambers constituting a by-pass passage and having an inlet for oil, said shell having an opening connecting one oil pass with said by-pass chamber and having other openings to connect a plurality of oil passes with the other of said chambers.

4. An oil cooler comprising a shell, a single core substantially filling said shell and including a plurality of cooling elements extending lengthwise of said shell and spaced one from the other to form an oil flow path through said shell, means within said shell to divide said oil flow path into a plurality of oil passes transverse to said shell, a structure mounted exteriorly of and spaced from said shell, overlapping all of said oil passes and extending entirely about said shell, longitudinal partitions dividing the space between said structure and said shell into a by-pass passage and a connecting passage, said shell having an inlet opening connecting said by-pass passage with the oil pass adjacent one end thereof, an outlet opening for the oil pass adjacent the other end thereof, and other openings connecting adjacent passes with said connecting passage.

5. In an oil cooler, a shell, a plurality of cooling elements within and extending lengthwise of said shell and spaced one from the other to form an oil flow path, means for closing the spaces between said cooling elements adjacent the respective ends thereof, other means for closing the spaces between said cooling elements intermediate the ends thereof to divide said oil flow path into a plurality of transverse oil passes, the sectional area of each oil pass taken on a line transverse to said cooling elements being defined by the surrounding wall of said shell, a structure arranged exteriorly of and spaced from said shell to form a by-pass passage extending lengthwise of said shell in heat exchange relation to each of said oil passes and of a circumferential width equal to at least one-half the circumference of said shell but less than the full circumference thereof, connections forming respectively an inlet and an outlet for said by-pass passage spaced apart lengthwise of said shell and a discharge passage for cooled oil, and a baffle arranged in said by-pass passage between said inlet and said outlet to distribute the oil circumferentially of said shell as it flows from said inlet to said outlet, said shell having an opening connecting one of said oil passes with said by-pass passage on that side of said baffle adjacent said outlet and having a second opening connecting another of said oil passes with said discharge passage.

WELDON WORTH.